United States Patent [19]

Tilly et al.

[11] Patent Number: 5,078,452
[45] Date of Patent: Jan. 7, 1992

[54] ONE-PIECE ACTUATION BUTTON FOR VEHICLE SEAT RECLINER

[75] Inventors: Lynn K. Tilly, Oxford; Janice E. Cote, Ann Arbor; Michael J. Sweers, Williamston, all of Mich.

[73] Assignee: Chrysler Corporation, Highland Park, Mich.

[21] Appl. No.: 630,627

[22] Filed: Dec. 20, 1990

[51] Int. Cl.⁵ ............................................. B60N 2/02
[52] U.S. Cl. .................................... 297/355; 297/367
[58] Field of Search .............. 297/355, 379, 341, 367, 297/370, 378; 24/295, 293, 457, 669

[56] References Cited

U.S. PATENT DOCUMENTS

| | | | |
|---|---|---|---|
| 3,632,168 | 1/1972 | Barello | 297/379 |
| 4,390,208 | 6/1983 | Widmer et al. | 297/379 |
| 4,593,441 | 6/1986 | St. Louis | 24/295 X |
| 4,637,650 | 1/1987 | Inoue | 297/379 X |
| 4,722,571 | 2/1988 | Sweers | 297/341 X |
| 4,829,689 | 5/1989 | Alshooler | 24/295 X |
| 4,888,854 | 12/1989 | Russell et al. | 297/379 X |
| 4,932,706 | 6/1990 | Wainwright et al. | 297/379 X |
| 4,998,772 | 3/1991 | Safran et al. | 297/355 |
| 5,002,339 | 3/1991 | Yamashita et al. | 297/355 |

Primary Examiner—Jose V. Chen
Attorney, Agent, or Firm—Edward P. Barthel

[57] ABSTRACT

One-piece plastic actuation button for a vehicle seat adjuster providing ready snap-in interlocking capture of the button in a panel elongated opening while permitting smooth reciprocal travel therein. The button comprises an elongated head portion having its undersurface formed with a coextensive guide channel sized to receive therein a tongue portion of a seat adjust lever. The channel cooperates with upper and lower vertically spaced stem portions projecting normally from the button face to swing the tongue and operate the release lever. The upper stem portion is a push-in retainer comprising bifurcated mirror-image hook-halves defining a slotted intermediate space therebetween and two opposed outwardly divergent slopes terminating in a pair of undercut locking shoulders. The hook-halves are resiliently deformable between a normal inserted locking condition wherein the tongue portion is received in the intermediate space and a compressed condition wherein the slopes permit push-in insertion in the panel opening.

3 Claims, 2 Drawing Sheets

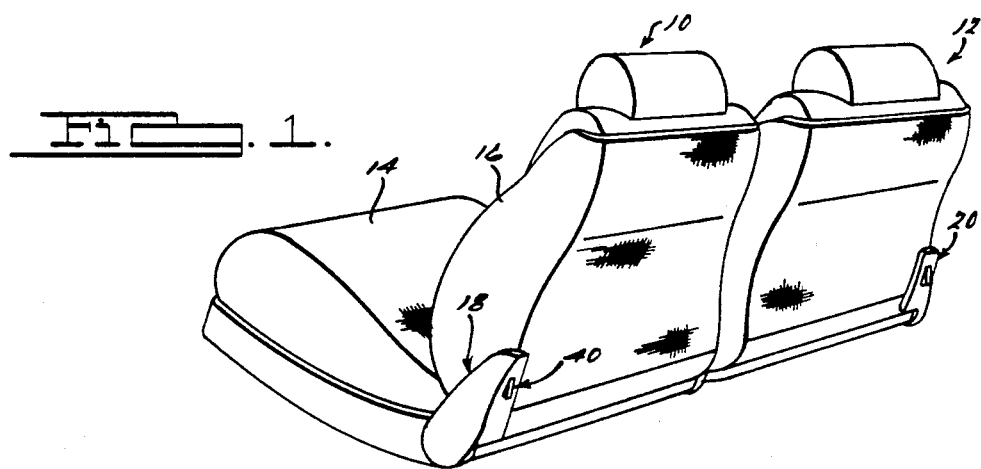
Fig. 1.
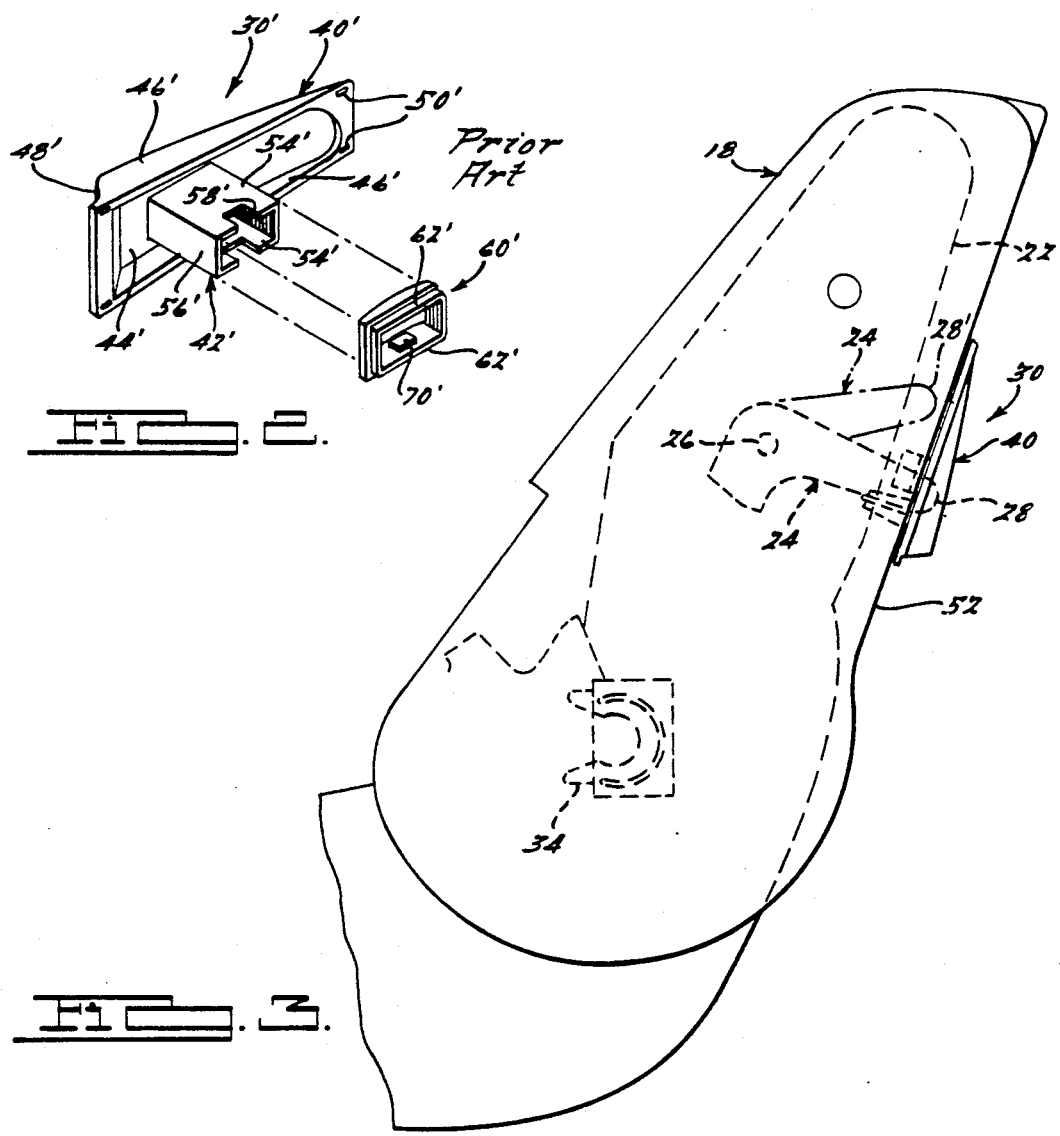
Fig. 2. Prior Art
Fig. 3.

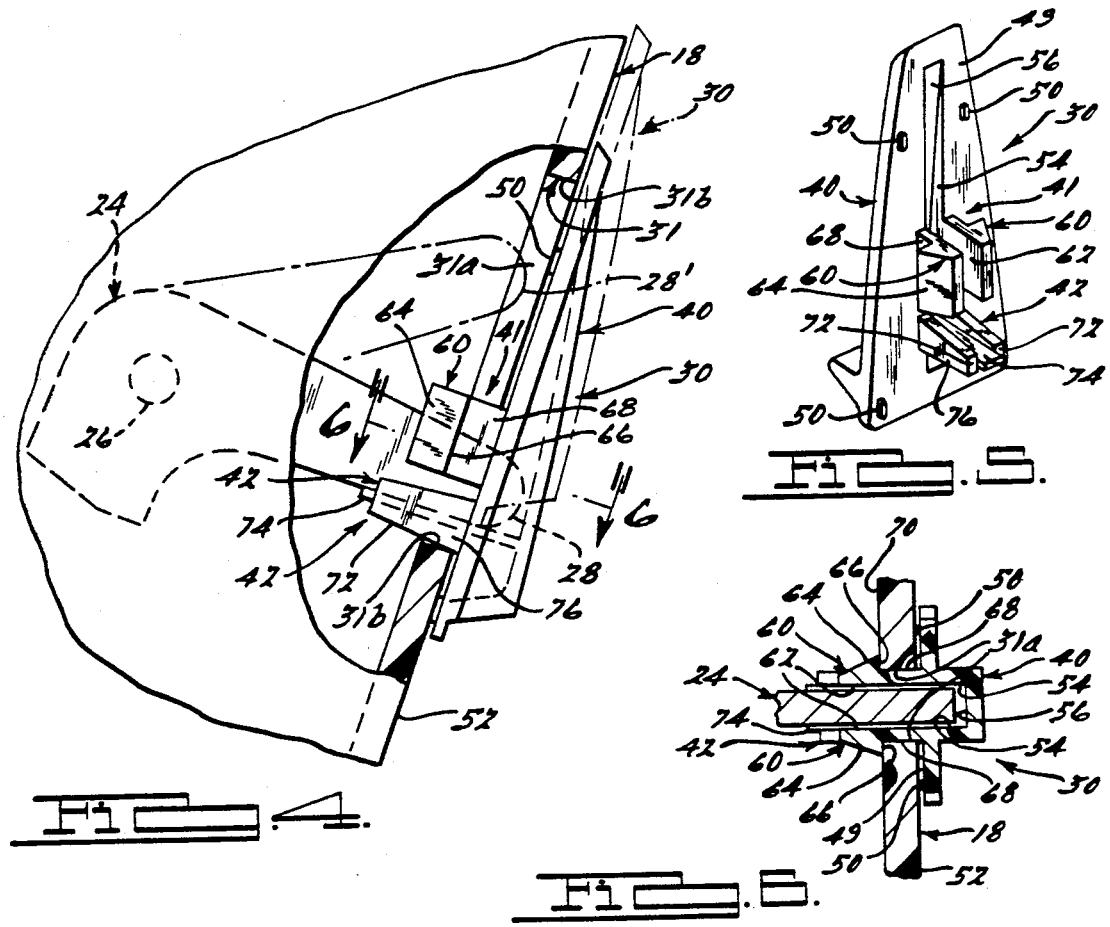
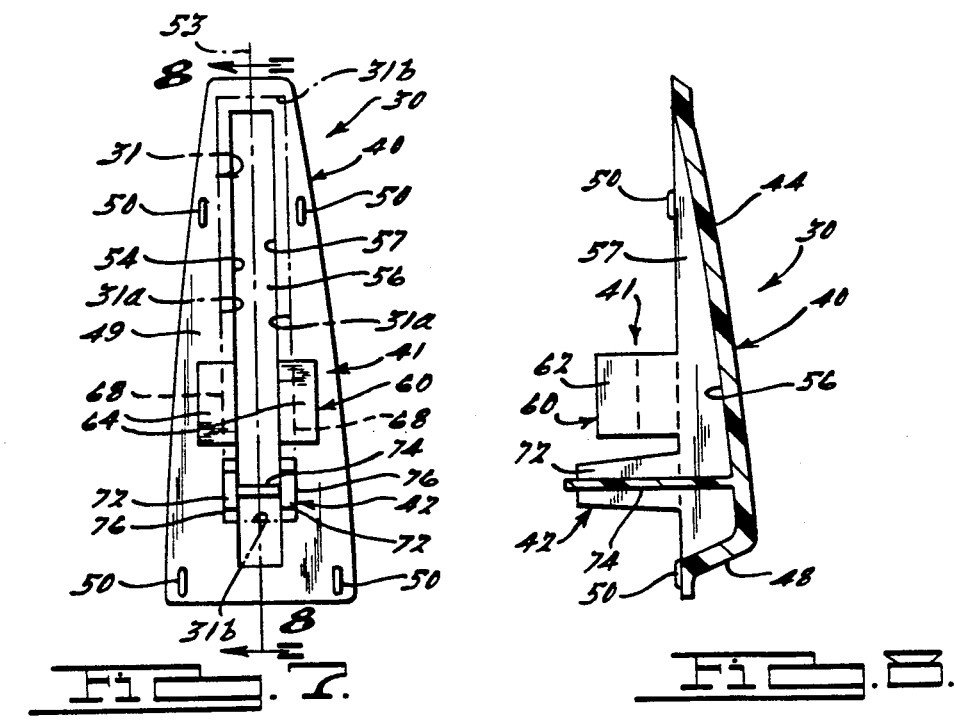

ONE-PIECE ACTUATION BUTTON FOR VEHICLE SEAT RECLINER

BACKGROUND OF THE INVENTION

This invention relates to vehicle seat structures and more particularly to an improved manually operated onepiece plastic seat back adjuster override actuation button with retainer.

The U.S. Pat. No. 4,722,521 issued Feb. 2, 1988 to Michael J. Sweers and assigned to the assignee of the present application, discloses a Button Retainer For Vehicle Seat Recliner which enabled a plastic actuation button to be retained without the use of a metal clip. As seen in prior art FIG. 2 the Sweers '521 patent discloses an actuator override button 30' comprising an elongated head portion 40' and an integral stem portion 42'. The button head portion includes an inclined long ramp portion 44' having a pair of wedge-shaped sides 46' interconnected by a steep sloped short ramp 48. The wedge shaped sides 46' have their free edges formed with a plurality of paired spacers 50 adapted to slidably ride on an outer surface of a shield panel to reduce frictional contact therewith.

The actuator button stem portion 42' has a boxshaped hollow rectangular-sectioned configuration with its free distal end open and its proximate or base end integral with the underside of the long ramp portion 44'. The stem portion 42 is defined by a pair of parallel side walls 54' and a pair of parallel end walls 56'. Each of the side walls 54 has an edge positioning slot 57' has a predetermined depth defined by bight-edge 58'. A frame member 60', dimensioned for slidable reception on the stem 42', has the interior surface of its side elements 62' formed with raised lugs 70' adapted to be slidably received in the edge positioning slots 58'. Arcuate shaped runners 74' are formed on the side elements 62' facing the fixed end of the stem portion. The slots position the frame member arcuate-shaped runners in juxtaposed relation to the panel's interior surface providing smooth reciprocal travel of the button along the panel opening. The button stem is inserted through a slot in the seat side shield and the plastic retainer collar fitted over the stem free end. The button stem and collar are next clamped into their assembly position and as a final step the collar is heat staked or sonic welded to the button stem.

SUMMARY OF THE INVENTION

It is an object of the present invention to provide an improved one-piece plastic actuation button with integral retainer and guide means for a seat back recliner mechanism which is inexpensive to make and readily installed.

It is another object of the invention to provide an improved actuation button as set forth above allowing ready snap-in interlocking capture of the button in a panel elongated opening while permitting smooth reciprocal travel therein.

It is still another object of the present invention to provide an improved actuation button as set forth above wherein the button undersurface is formed with an elongated channel for receiving a tongue portion of an actuating lever wherein the snap-in retainer comprises inwardly deformable bifurcated hook-halves on either side of the channel. The hook-halves provide a slotted space therebetween which receives, together with the aligned channel, the tongue portion therein interlocking the button bifurcated retainer in the opening.

According to the present invention, the one piece plastic actuator button is molded to provide its inner face with an elongated guide channel aligned on its plane of symmetry. Upper and lower vertically spaced stem portions project inboard from the button inner face to swing the tongue portion and pivot the lever to its release position. The upper stem portion is a push-in bifurcated retainer in the form of mirror image transversely spaced hook-halves straddling the clearance channel. The hook-halves provide two opposing inner tongue guide surfaces establishing an intermediate tongue receiving slotted space formed as a continuation of the guide channel. The resiliently deformable hook-halves are formed with two opposed outwardly divergent slopes terminating in a pair of undercut locking shoulders.

Upon the button retainer being pushed into the panel opening the slopes contact the opening side edges compressing the hook-halves into the tongue receiving slotted space. With the retainer inserted through the opening the hook-halves return to their relaxed condition wherein the locking shoulders abut the panel inner surface. When assembled the tongue portion is spring biased downwardly into contact with a lower stem portion such that the lower stem portion is urged into contact with the opening bottom edge. As a result the tongue portion permanently occupies at least a portion of the intermediate slotted space between the hook-halves thereby interlocking the actuator button in the opening with the tongue portion free end received in the guide channel. Manually moving the button upwardly in the elongated opening causes the lower stem portion to cam the tongue portion upwardly pivoting the release lever and actuating the seat mechanism.

BRIEF DESCRIPTION OF THE DRAWING

Other objects, features, and advantages of the present invention will become apparent to those skilled in the vehicle seating art are readily apparent from the following detailed description of the best mode taken in conjunction with the accompanying drawings in which:

FIG. 1 is a perspective view of a pair of automobile seat structures embodying the seat back adjuster release button of the present invention;

FIG. 2 is an exploded perspective view of the prior art actuation button and frame retainer member;

FIG. 3 is an enlarged fragmentary side elevational view of the seat latching mechanism shield of panel of FIG. 1;

FIG. 4 is an enlarged fragmentary side elevational view the one-piece actuation button in its downward most resiliently biased position;

FIG. 5 is a perspective view of the plastic actuation button of the present invention;

FIG. 6 is a fragmentary cross-sectional view taken on the line 6—6 of FIG. 4;

FIG. 7 is a detail plan elevational view of the actuation button showing the inner surface thereof; and FIG. 8 is longitudinal sectional view taken on the line 8—8 of FIG. 7.

DETAILED DESCRIPTION OF THE INVENTION

Referring now to FIG. 1 of the drawings, a pair of side-by-side left and right vehicle seat structures are shown at 10 and 12 positioned in the front or forward portion of a motor vehicle passenger compartment. The left seat structure 10 on the driver side of the vehicle includes a seat cushion 14 and a seat back 16. The seat cushion 14 is supported on the vehicle floor by a track mechanism (not shown) as disclosed, for example, in the U.S. Pat. No. 4,634,180 the disclosure of which is incorporated by reference herein. A seat latching mechanism of the type shown in the mentioned '180 patent is positioned on the outboard side of the vehicle and covered by a shield panel generally indicated at 18 in FIG. 1. A right side shield panel is partially shown at 20 for the passenger seat structure 12. As the corresponding parts for the seat structures 10 and 12 are mirror images of each other, only the left seat structure 10 will be described.

With reference to FIG. 3, the left shield panel 18 is shown covering a seat latching or reclining mechanism indicated in outline by dashed lines at 22. A portion of a manual release bell-crank lever, as shown by dashed lines at 24, is pivotally supported about a transversely extending pivot pin 26. The lever 24 has a tongue portion 28 adapted to be rotated counter clockwise about pin 26 from a lower spring biased position to an upper release position, indicated at 28'.

A manual one-piece actuation button, generally indicated at 30 and molded from suitable flexible elastomeric or plastic material, is mounted for smooth vertical sliding movement along the major axis of an elongated rectangular opening 31 formed in the panel 18. As seen in FIGS. 4 and 7 the rectangular opening 31 is defined by parallel side edges 31a and upper and lower end edges 31b. The lower end of the shield panel 18 is releasably attached to the latch mechanism 22 by means of a suitable metal clip, shown at 34 in FIG. 3, captured by a boss 36 integrally formed on the panel inner surface. Reference may be made to U.S. Patent Application Ser. No. 07/518,622 filed May 3, 1990 for W. M. Safran et al., entitled Attachment Clip For Seatback Side Shield. The disclosure of the Safran application, assigned to the assignee of the present application, is incorporated by reference herein.

Turning now to FIGS. 5-8, the one-piece actuator override button 30 comprises an elongated head portion 40 and first 41 and second 42 integral longitudinally spaced stem portions. The button head portion 40 includes an inclined long ramp portion 44 having a pair of sides 46 with the long ramp interconnected to a steep short ramp 48. The head portion 40 has a planar undersurface 49 formed with a plurality of paired spacers 50 adapted to slidably ride on outer surface 52 of the shield panel 18 to reduce frictional contact therewith. It will be noted in FIGS. 5 and 7 that the button head undersurface 49 is formed with an elongated rectangular-shaped channel aligned on longitudinal axis 53 of symmetry of said button. As seen in FIG. 6 the channel is defined by parallel opposed flanks 54-54 and a recessed back wall 56.

The actuator button first stem portion 41 is in the from of a push-in bifurcated catch or retainer comprising a pair of mirror image transversely spaced hook-halves 60—60. The hook-halves 60—60 form two opposing inside surfaces 62—62 defining a tongue slotted opening therebetween sized to receive the recliner lever's free end portion 28 therein. It will be noted in FIG. 6 that the inside surfaces 62—62 are coplanar with their associated channel flanks 54—54 so as to define continuations thereof.

As seen in FIGS. 5 and 6 the hook-halves 60—60 have two opposite outwardly convergent slopes 64 terminating in two opposite undercut shoulders 66—66. The shoulders 66—66 extend parallel with and are spaced a predetermined distance from the head portion undersurface 49 with the distance established by opposite hook-halve parallel guide faces 68—68. It will be appreciated that the hook-halves 60—60 are resiliently deformable between a compressed juxtaposed condition and a normal relaxed locking condition. Thus, the slopes 64—64 are adapted to initially engage respective side edges 31a—31a for push-in insertion in the panel opening 31. Upon the hook-halves passing through the opening they return to their normal relaxed condition wherein the shoulders 66—66 are positioned in flush locking engagement with the panel inside surface 70.

With reference to FIGS. 5, 7, and 8 the lower stem portion 42 is in the form of a H-sectioned cam member comprising a pair of opposed legs 72—72 shown straddling the channel and connected by a cross web 74. It will be seen in FIG. 8 that the web 74 extends from the channel back wall 56 so as to be bottomed therein. As viewed in FIG. 7, the legs 72—72 define two opposite outside leg lower guide surfaces 76—76 which are coplanar with respective hook-halve upper guide faces 68—68. It will be appreciated that the upper and lower vertically spaced paired guide surfaces 68—68 and 76—76 provide smooth reciprocal travel of the actuator button in the elongated opening 31.

With reference to FIG. 4 it will be noted that the bell-crank lever is spring biased in a clockwise rotational direction such that its tongue portion 28 is urged into contact with the lower stem portion cross web 74. As a result the lower stem portion legs 72—72 are normally biased into contact with the opening lower edge 31b. Upon the actuator button 30 being pushed upwardly to its phantom line position, shown in FIG. 4, the tongue portion 28 is rotated to a corresponding phantom line position by the cross web 74. Release of the actuator button causes it to be returned to its normal position biased into contact with the opening lower edge 31b.

While the invention has been described with reference to a particular embodiment thereof, it will be apparent that various changes may be made therein without departing from the spirit and scope of the invention and it is intended by the appended claims to cover all such modifications as fall within the true spirit and scope of the invention.

What is claimed is:

1. A vehicle seat structure comprising a seat back adjuster apparatus having a pivotal release lever formed with a plate-like manually activated tongue, a panel having planar inner and outer surfaces for covering the seat back adjuster apparatus formed with an elongated rectangular opening, said tongue having a free end portion projecting through said opening, said opening defined by parallel side edges and upper and lower end edges such that the major axis thereof lies in a vertically disposed plane, resilient means biasing said tongue free end portion downwardly adjacent said opening lower edge, a manually operated elongated actuation button formed with a head portion and integral stem means, said stem means projecting axially through said opening and including engaging means thereon adapted to capture said tongue free end portion such that said button may be slidably reciprocated on said panel outer face along said opening major axis to operate said release lever, wherein the improvement comprises:

said elongated one-piece actuation button having a vertically disposed plane of symmetry including said opening major axis, said button formed with the undersurface thereof positioned in spaced parallel opposed relation to said panel outer surface, said butter undersurface formed with a rectangular-sectioned elongated narrow channel aligned on said plane of symmetry and defined by parallel sides and a recessed back;

said stem means comprising upper and lower vertically spaced stem portions projecting from said button inner face, said upper stem portion having a push-in bifurcated retainer comprising a pair of mirror image transversely spaced hook-halves, said hook-halves forming two opposing hook-half inside surfaces defining a tongue free end portion slotted space therebetween, each said inside surface being a continuation of an associated channel side;

said hook-halves having two opposite convergent slopes terminating in two opposite undercut shoulders parallel with and spaced a predetermined distance from said button undersurface by opposite outside hook-halve guide faces, whereby said hook-halves being deformable between a compressed juxtaposed condition wherein said slopes permitting push-in insertion through said panel opening and a relaxed locking condition wherein said shoulders adapted to abut said panel inner surface;

said lower stem portion in the form of an H-sectioned cam member comprising a pair of opposed legs connected by a cross web with said legs straddling said channel and said cross web bottomed in said channel, said opposed legs having two opposite outside leg guide surfaces defining parallel planes wherein each said plane including an associated hook-half outside guide surface;

whereby with said button hook-halves and said cam member being captured in said panel opening said downwardly biased tongue free end portion being received in said hook-half tongue slotted space and in said channel so as to apply a downward force on said cross web thereby biasing said legs against said opening lower edge, whereby upon said button being manually pushed upwardly in said opening said cam member elevating said tongue therewith for pivoting said release lever while said hook-half outside guide faces and said cam member leg outside guide surfaces ride on said opening side edges providing controlled reciprocal travel along said opening major axis.

2. The improved one-piece actuation button as set forth in claim 1, wherein said tongue free end portion interlocking said button in said opening upon being received in said slotted space.

3. The improved one-piece actuation button as set forth in claim 1, wherein said button integrally molded of flexible elastomeric material.

* * * * *